May 15, 1934.    H. R. BLISS ET AL    1,958,739
STITCHING MACHINE
Filed April 21, 1932    4 Sheets-Sheet 1
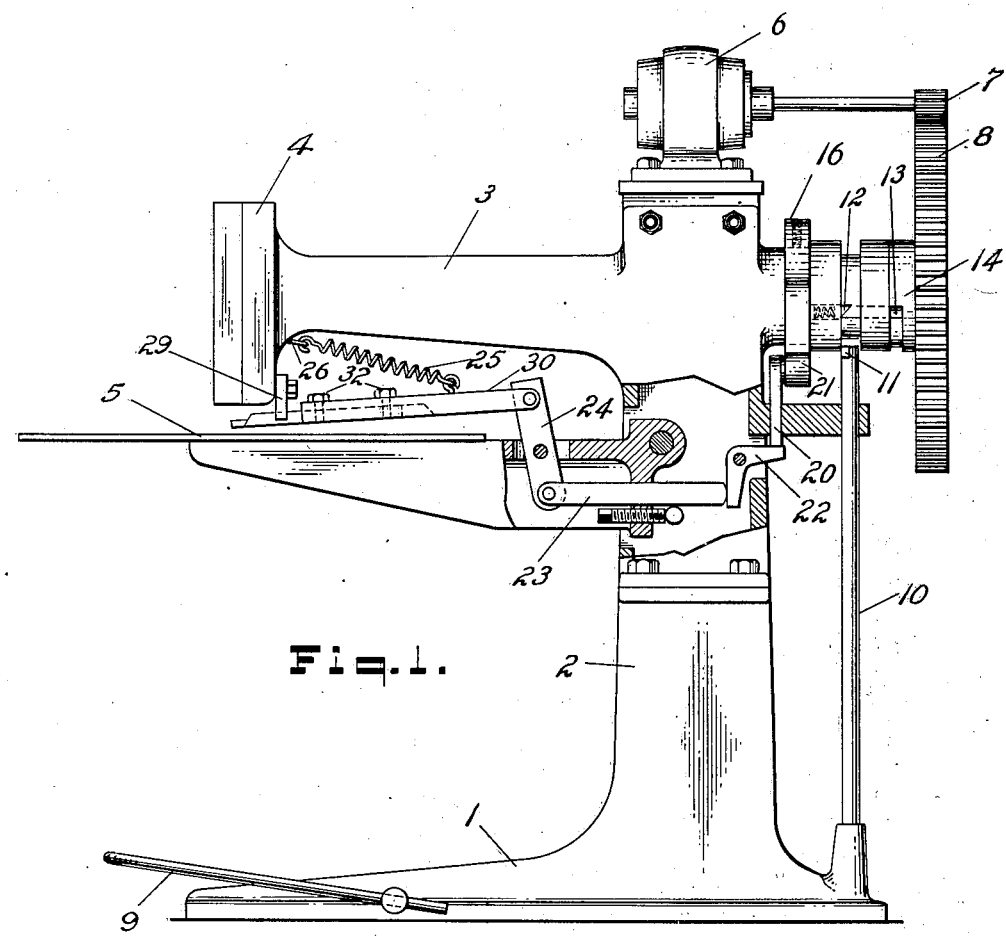
Fig.1.
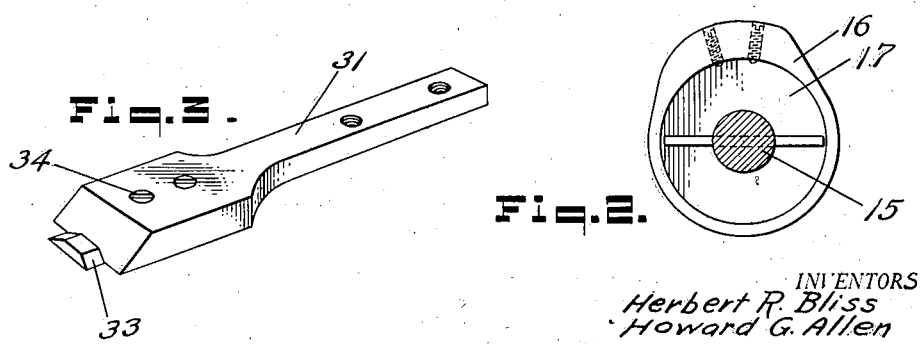
Fig.3.
Fig.2.
INVENTORS
Herbert R. Bliss
Howard G. Allen
BY
Barnes, Kisselle & Laughlin
ATTORNEYS

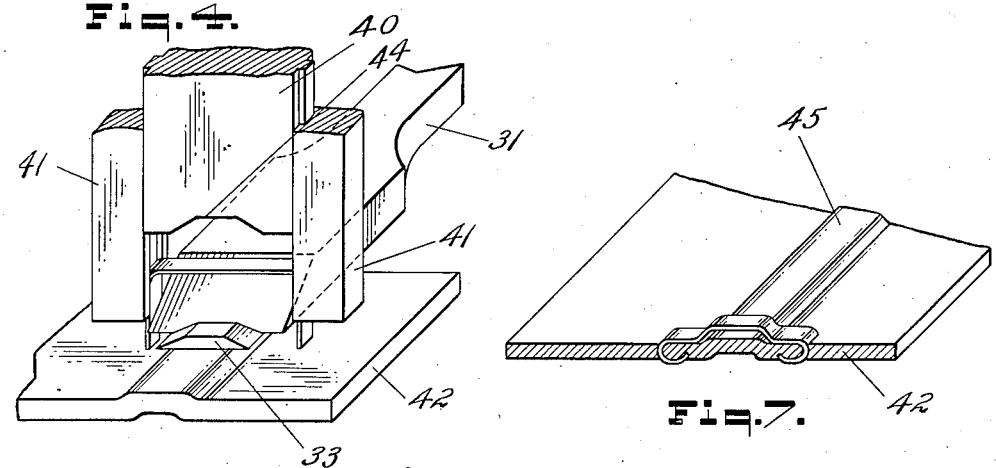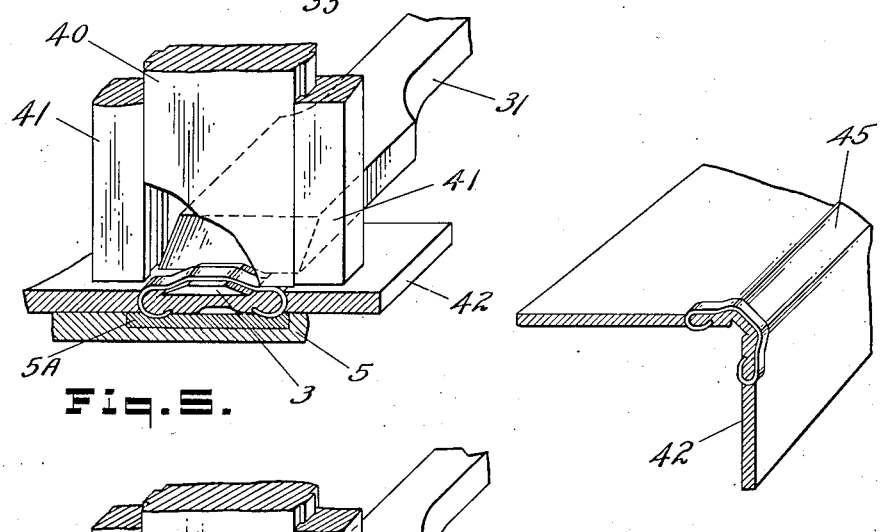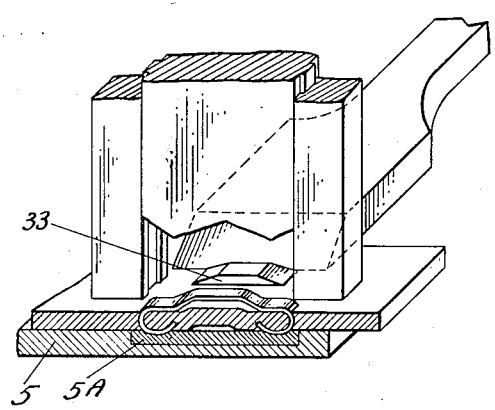

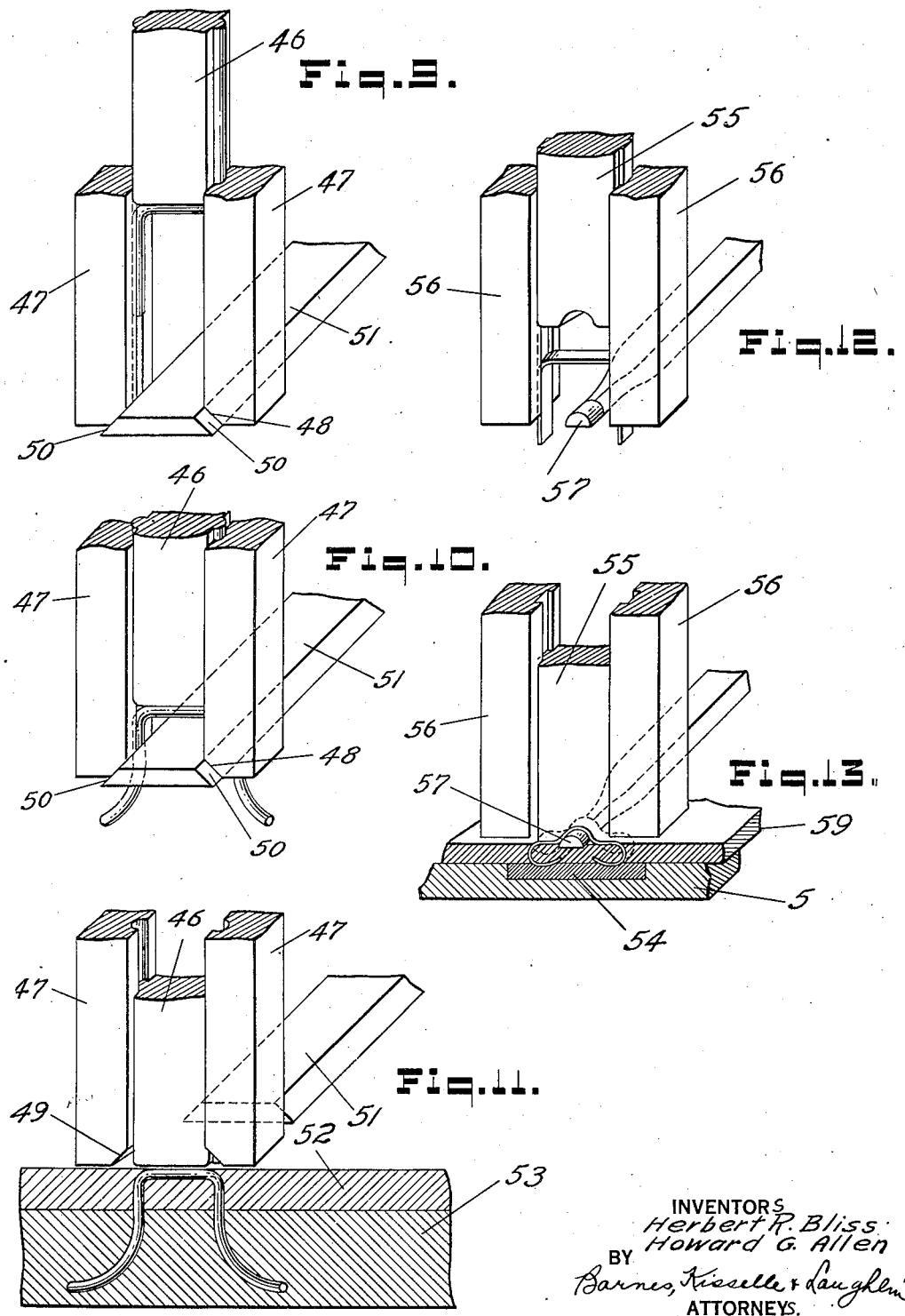

May 15, 1934.  H. R. BLISS ET AL  1,958,739
STITCHING MACHINE
Filed April 21, 1932  4 Sheets-Sheet 4
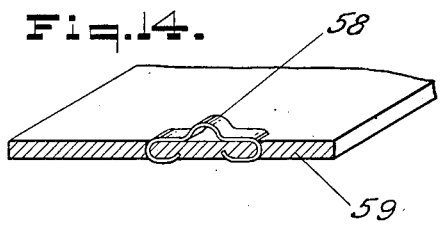
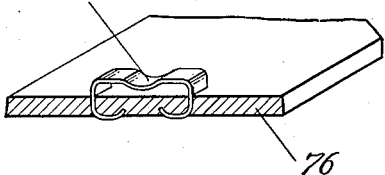
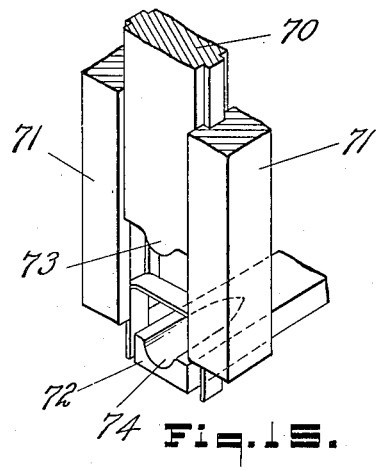
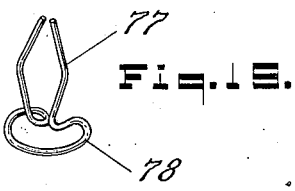
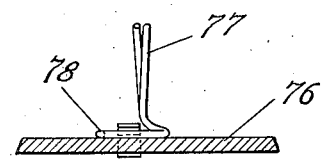
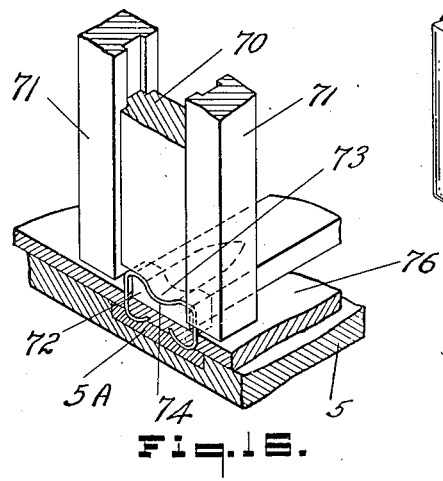
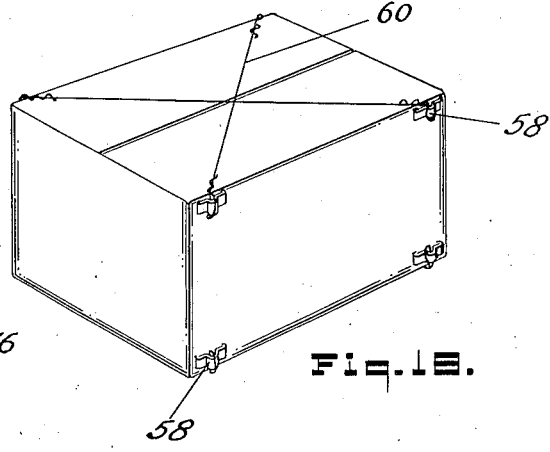
INVENTORS
Herbert R. Bliss.
Howard G. Allen
BY
Barnes, Kisselle & Laughlin
ATTORNEYS.

Patented May 15, 1934

1,958,739

UNITED STATES PATENT OFFICE 1,958,739

STITCHING MACHINE

Herbert R. Bliss and Howard G. Allen, Niagara Falls, N. Y., assignors, by mesne assignments, to Boston Wire Stitcher Company, Warwick, R. I., a corporation of Maine Application April 21, 1932, Serial No. 606,647

1 Claim. (Cl. 1—2)

This invention has to do with a stitching machine particularly of the type for driving stitches having legs for penetrating the work and which may be fashioned over an anvil, and having a back or body portion connecting the legs. The invention is directed particularly towards the provision of a machine for providing specially formed stitches which, due to their particular formation, are adapted to perform one or more functions other than that of merely holding two or more parts together as is the usual function of a stitch.

More particularly, the invention is concerned with a machine for applying stitches to work wherein the back or body portion of the stitch is given any one of several types of formations whereby the stitch is adapted for useful purposes. One form of stitch is one wherein the body portion is so formed that the work may be folded or bent to form a corner with the back of the stitch bridging the corner to reinforce the same. Another formation may be given the stitch so that its back presents a suitable shape for attachment thereto of lengths of fastening material such as wire or the like. The back or body portion of the stitch may be so formed as to receive a special type of fastener element. A still further object of the invention is the provision of a machine wherein the legs of the stitch may be specially formed so that the legs may be more or less locked or keyed into the work into which they are driven.

In the accompanying drawings:

Fig. 1 is a side elevational view of a machine constructed in accordance with the invention, with parts cut away and parts in section illustrating operating mechanism.

Fig. 2 is a detail of an operating cam element.

Fig. 3 is a perspective of a stitch-forming shoe.

Figs. 4, 5 and 6 are more or less diagrammatical illustrations showing three successive positions of machine parts in forming a stitch.

Fig. 7 is a sectional view through a piece of work illustrating a stitch formed by the mechanism shown in Figs. 4, 5 and 6.

Fig. 8 is a view similar to Fig. 7 showing the work fashioned to form a corner.

Figs. 9, 10 and 11 are somewhat diagrammatical views illustrating a mechanism for forming a different type of stitch.

Figs. 12 and 13 are diagrammatical views illustrating another form of shoe for forming a different type of stitch.

Fig. 14 is a sectional view taken through a piece of work showing a stitch formed by the mechanism shown in Figs. 12 and 13.

Figs. 15 and 16 are diagrammatical views illustrating mechanism for forming a still further modified type of stitch.

Fig. 17 is a view taken through a piece of work illustrating the finished stitch.

Fig. 18 is a perspective view of a container illustrating a use for the type of stitch shown in Fig. 14.

Fig. 19 is a perspective view illustrating a fastener which may be used with the stitch shown in Fig. 17.

Fig. 20 is a view illustrating the fastener mounted to the work by means of the stitch.

The stitching machine may comprise a machine having the usual base 1, post 2, arm 3 carrying a stitcher head 4 below which is a work table provided with a suitable anvil for clinching the stitches, the work table being shown at 5. The stitching machine may be operated through the means of a motor 6, and meshing gears 7 and 8, and the stitching machine may be started and stopped by the operator through the means of a pedal 9 which shifts a rod 10. The rod 10 has an inclined face 11 for engaging an inclined face 12 of a spring pressed bolt 13 designed to move behind a shoulder 14 under spring action for engaging the clutch, and to be moved out from behind the shoulder 14 for release of the clutch. The mechanism so far described may be of the usual stitching machine type and further detailed description is unnecessary.

A stitcher head driving shaft is shown at 15, and a cam element 16 which may be an open cam as shown is mounted upon the shaft. This cam element advantageously is mounted to the shaft 15 through the means of a circular disk 17 pinned to the shaft, and relative to which the cam may be adjusted and fixed by set screws 18. A cam follower rod is shown at 20 having a cam engaging roller 21, and the lower end of which abuts an arm of a bell crank 22. This bell crank contacts through its other arm with a reciprocable link 23 connecting to a lever 24. A spring 25 may be connected to the arm 30 and to a fixed part of the machine, as for example, the stitcher head at 26. This spring normally holds the several parts just described in operative relation, with the roller 21 held against the open face cam.

A shoe arm 30 may be connected to the lever 24 to be actuated thereby, and this arm is for carrying a shoe for fashioning a stitch or staple. A shoe carrier, as shown in Fig. 3, may be separated from the shoe arm 30, the carrier being shown at 31. This shoe carrier may be fixed to the arm 30 as by means of cap screws 32, and a shoe proper 33 may be attached to the shoe carrier as by means of screws 34. Accordingly, shoes of different shapes may be readily attached to the shoe carrier for performing different types of work or stitches.

It will be understood that a stitch may be driven into work upon each revolution of the shaft 15, and that the cam 16 is so adjusted to the shaft 15 as to reciprocate the shoe in and out of position as regards a stitch in proper timed relation. In Figs. 4, 5 and 6 there is illustrated a driver 40 of a stitching machine, and guides 41 therefor, whereas the work is illustrated at 42. In Fig. 4 the driver 40 is in the act of driving the legs of the stitches through the work 42, and the shoe 33 lies underneath the body of the stitch. In Fig. 5 the stitch has been driven and the legs thereof turned over by a suitable anvil 5A which may be composed of an insert of hard metal in table 5. The shoe 33 underlies the body of the stitch and it will be noted that the driver is suitably shaped as at 44 for accommodating the same. The high point of the cam now actuates the parts and retracts the shoe from underneath the body of the stitch, as shown in Fig. 6. Accordingly, the body of the stitch is spaced from the work as illustrated in Fig. 7, and this stitch is adapted for reinforcing a corner of a fiber board blank or the like wherein the work is fiber board and is creased as at 45. When the fiber board is fashioned to form a corner, as illustrated in Fig. 6, the body of the stitch is drawn taut around the corner and reinforces the same. Such a stitch is shown in United States Letters Patent No. 1,917,920 issued July 11, 1933, to H. R. Bliss on copending application Serial No. 512,527, filed January 31, 1931.

Another type of stitch is provided by the structures illustrated in Figs. 9, 10 and 11, and in this form the legs of the stitch are worked upon. A suitable driver 46 and guides 47 are shown, and the guides have angled faces 48 and 49 for accommodating the angular parts 50 of a shoe 51. As the driver urges the stitch or staple downwardly, the legs thereof are spread apart by the angle faces 50 of the shoe as shown in Fig. 10. As the driver nears the end of its driving movement the shoe 51 retracts, and the driver urges the body of the stitch against the work, as shown in Fig. 11. This form of stitch is advantageous for connecting superimposed pieces of work, as at 52 and 53, with the legs of the stitches not penetrating entirely through the work, but being so fashioned and bent as to establish an efficient connection.

The same machine may be utilized for forming the stitch just described, the only change required is that of putting in a different shaped shoe, and also timing the cam to retract the shoe at such time as to allow the driver to drive the stitch body against the work.

Another type of stitch may be formed by the mechanism shown in Figs. 12 and 13 wherein the driver is at 55 and the guides at 56 and the shoe at 57. This shoe forms a marked eyelet in the stitch, as shown in Fig. 13, and is also shown in Fig. 14 wherein the eyelet formation is at 58 and the work at 59. This eyelet may be employed for receiving the ends of wire reinforcing members 60 for a fiber board container or the like, as illustrated in Fig. 18.

A still further modified stitch may be made by the mechanism shown in Figs. 15 and 16 wherein the driver is shown at 70, the guides at 71, and the shoe at 72. The driver has a protruding part 73 and the shoe has a recess 74. When the stitch is driven the body portion thereof is maintained spaced from the work, as illustrated in Fig. 17 wherein the work is illustrated at 76. This form of stitch is useful for receiving fastener devices, as for example, a fastener device 77, as shown in Fig. 19, having a loop 78 adapted to be placed between the body of the stitch and the work and to be held in position by the depressed portion 75 of the stitch snapping into the loop 78. The fastener 77 may be of any suitable type and these parts may be employed, for example, in the inside trimming of an automotive vehicle wherein the work 72 comprises fiber board backing material for carrying the trimming and which may be held in place in the vehicle through the means of fastener devices 77. The fastener may be held attached by placing the loop portion into the specially formed stitch, as shown in Fig. 20, with the depressed part 75 projecting into the loop to hold the parts together. The spring 25 performs a double function; it holds the cam follower against the cam 16 and exerts an upward component on the arm 30 so that the arm and shoe are held normally up against a guide bracket 29 so that the arm and shoe are normally spaced from the table 5 to permit of getting the work into and out of position.

It will be seen that one stitching machine may be employed for forming several different types of stitches, and the machine may be changed over by merely changing a few parts such as the shoe, the driver for the stitches, and in the case of the form shown in Figs. 9, 10 and 11, the side guides for the driven stitches. Also, the timing of the cam may be varied as needed.

We claim:

The combination in a stitching machine, a fixed stitcher head having a driver and arranged to have U-shaped stitches driven therefrom, a work support spaced below the stitcher head, a reciprocable shoe movable generally horizontally between the stitcher head and work support and arranged to underlie the body of the stitch as it is driven with the legs of the stitch on opposite sides of the shoe whereby the body of the stitch is spaced from the work, and means for withdrawing the reciprocable shoe from underneath the stitch after the same has been driven, the said driver and said shoe having cooperating protruding and recessed parts for clamping opposite sides of the stitch body for shaping the same by the driver action in accordance with the shape of said cooperating parts.

HERBERT R. BLISS.
HOWARD G. ALLEN.